United States Patent [19]
Hube

[11] Patent Number: 5,243,381
[45] Date of Patent: Sep. 7, 1993

[54] METHOD FOR COMPILING MULTIPLE JOBS WITH JOB REFERENCE SHEETS

[75] Inventor: Randall R. Hube, Rochester, N.Y.

[73] Assignee: Xerox Corporation, Stamford, Conn.

[21] Appl. No.: 165

[22] Filed: Jan. 4, 1993

[51] Int. Cl.⁵ ......................................... G03G 15/00
[52] U.S. Cl. ...................................... 355/204; 355/77
[58] Field of Search .............. 355/204, 203, 208, 209, 355/77, 202; 346/160

[56] References Cited

U.S. PATENT DOCUMENTS

| | | | |
|---|---|---|---|
| 4,716,438 | 12/1987 | Farrell | 355/6 |
| 4,757,348 | 7/1988 | Rourke et al. | 355/6 |
| 4,970,554 | 11/1990 | Rourke | 355/202 |
| 4,987,447 | 1/1991 | Ojha | 355/204 |
| 5,124,748 | 6/1992 | Tanabe et al. | 355/200 |
| 5,126,858 | 6/1992 | Kurogane et al. | 355/202 X |

*Primary Examiner*—R. L. Moses
*Attorney, Agent, or Firm*—Gary B. Cohen

[57] ABSTRACT

A method is provided for printing a job, represented by a set of electronic pages, with a job reference sheet in a printing system, the printing system having a printer and a scanner adapted to both convert the job into the set of electronic pages and decode machine readable code. The method includes the steps of storing the set of electronic pages in a memory section and assigning a unique job identifier to the stored job for indicating a location of the stored job in the memory section. The method further includes the steps of printing the job reference sheet so that the unique job identifier is designated on the job reference sheet in machine readable code and scanning the job reference sheet for reading the machine readable code to retrieve the set of electronic pages from the memory section for printing with the printer.

24 Claims, 12 Drawing Sheets

METHOD FOR COMPILING MULTIPLE JOBS WITH JOB REFERENCE SHEETS

The present invention relates generally to a technique for an electronic printing system, and, more specifically, to a method for compiling a plurality of jobs into an assembled job.

High speed electronic copying and printing machines convert original images into image signals or pixels, and in that form process the image signals to provide the desired output which typically is in the form of copies or prints. Machines of this type naturally are and indeed expected to be highly automated to speed up job production and reduce operator time and involvement to the barest minimum.

Because of their high capacity, speed, and versatility, these machines are particularly suitable for use in central facilities or sites such as commercial printing establishments, in-plant copying and printing departments, etc. These applications typically queue jobs through all stages of the work process and utilize tools such as 'job tickets' to direct the work flow. These 'tickets' provide the direction to operators of the equipment to act on the hard documents being readied for production, the instructions serving as programming parameters to transform the original documents (galleys/graphics/pictures, etc.) from separate entities into integrated structures that are then ready for printing onto various types of substrates.

To allow the operator to efficiently manage jobs by performing tasks in efficient clumps, it is desirable to program ahead several jobs at once. That is, the operator/shop will seek to queue operations so that incoming jobs will be stacked prior to programming following which the individual stacks are programmed. Once the jobs are programmed, the operator can then place the job in the input hopper for processing.

The following patents relate to electronic printing systems employing job and/or page separators to control the printing of a job:

U.S. Pat. No. 4,716,438
Patentee: Farrell
Issued: Dec. 29, 1987
U.S. Pat. No. 4,757,348
Patentees: Rourke et al.
Issued: Jul. 12, 1988
U.S. Pat. No. 4,970,554
Patentee: Rourke
Issued: Nov. 13, 1990
U.S. Pat. No. 4,987,447
Patentee: Ojha
Issued: Jan. 22, 1991

Each of the above-indicated patents discloses the use of job and page separators to program a high speed printing machine in which the separators, which are designed to be added to and scanned with the document originals being processed, bear job programming information in the form of a bar code. The job and page separators are scanned by the machine document scanner, distinguished from the document originals and the bar code read to provide control instructions for operating the printing machine. Additionally, each of the above-indicated patents, discloses that the separators can be generated by the printing machine or a suitable off-site device capable of generating bar codes compatible with the printing machine.

While each of the above-discussed separators serves as a pointer to indicate where a suitable set of Job Programming instructions resides in the printing machine, none of those separators indicates how one job can be combined with another job. For example, in certain printing systems, such as the printing system disclosed by U.S. Pat. No. 4,970,554, a plurality of jobs can be stored in a printing system for subsequent printing, and yet the respective separators are not adapted to indicate the location of that job. Accordingly, these separators cannot be employed to combine the plurality of jobs into a single master job.

In the electronic printing system known as DocuTech ™, manufactured by Xerox¹ Corporation, various parts of a job can be merged through use of a job supplement mode, the details of which are discussed in the following patent application:

Patent Application Ser. No. 07/538,453
Entitled: Job Supplement for Electronic Printing Machines
Filed: Jun. 15, 1990

In practice, the job supplement is used to supplement a job as it is being scanned into the printing system. That is, when the job supplement mode is engaged, any number of additional documents or groups of documents may be scanned in with the job being scanned. Upon supplementing the job at the scanner, an END JOB icon is selected, and the supplemented job is stored in a memory section of the printing system.

A current approach for assembling a plurality of jobs on the DocuTech ™ printing system to form a single job comprises the following steps:

1) Wait for all of the jobs to arrive at a holding repository;
2) Establish a "master" document by either choosing one of the jobs as a "master component" or creating a new "blank" master document;
3) Open (or edit) the master document;
4) Copy the other remaining jobs into the master document, one-by-one, by selecting the page location where each job is to be inserted. During this step, the operator must take care to understand that page numbers after the insertion point gets changed each time a job is inserted;
5) Close the master document and develop job level instructions for the master document (such as instructions relating to binding, stitching, copy count, etc.); and
6) Copy the master document to a printer queue for proofing or final printing.

For a printing system which "decomposes" a stream of image data written in a page description language ("PDL"), the following reference suggests an approach for merging a plurality of jobs through use of the PDL:

Harrington, S. J. and Buckley, R. R.
Interpress: The Source Book
pp. 371–379
Simon & Schuster, Inc.
New York, N.Y.
1988

The above reference discloses an example in which a program, written in a PDL, "namely Interpress", is employed to combine a plurality of masters into a single master. The resulting master is relatively small because it includes references only to component files and not to their contents. Furthermore, if a component is revised, the overall document automatically contains the revision. There is no danger of inconsistency between the components and the combined masters.

With the current approach for assembling a plurality of jobs on the DocuTech ™ printing system, assembling the master job can be time-consuming and tedious, particularly when the above-mentioned step 4) must be repeated numerous times. Additionally, while the technique taught by "The Source Book" appears to be quite eloquent, the technique is intended for use on a printing system that uses a PDL. It would be desirable to provide a technique for compiling a plurality of jobs into a single, assembled job in an efficient manner which does not require any programming with a PDL as not all systems support PDL input.

In accordance with the present invention there is provided a method of printing a job, represented by a set of electronic pages, with a job reference sheet in a printing system having a printer and a scanner adapted to both convert the job into the set of electronic pages and decode machine readable code. The method includes the steps of: storing the set of electronic pages in a memory section; assigning a unique job identifier to the stored job for indicating a location of the stored job in the memory section; printing the job reference sheet so that the unique job identifier is designated on the job reference sheet in machine readable code; and scanning the job reference sheet for reading the machine readable code and retrieving the set of electronic pages from the memory section for printing with the printer.

These and other aspects of the invention will become apparent from the following description, the description being used to illustrate a preferred embodiment of the invention when read in conjunction with the accompanying drawings.

Figure 1:
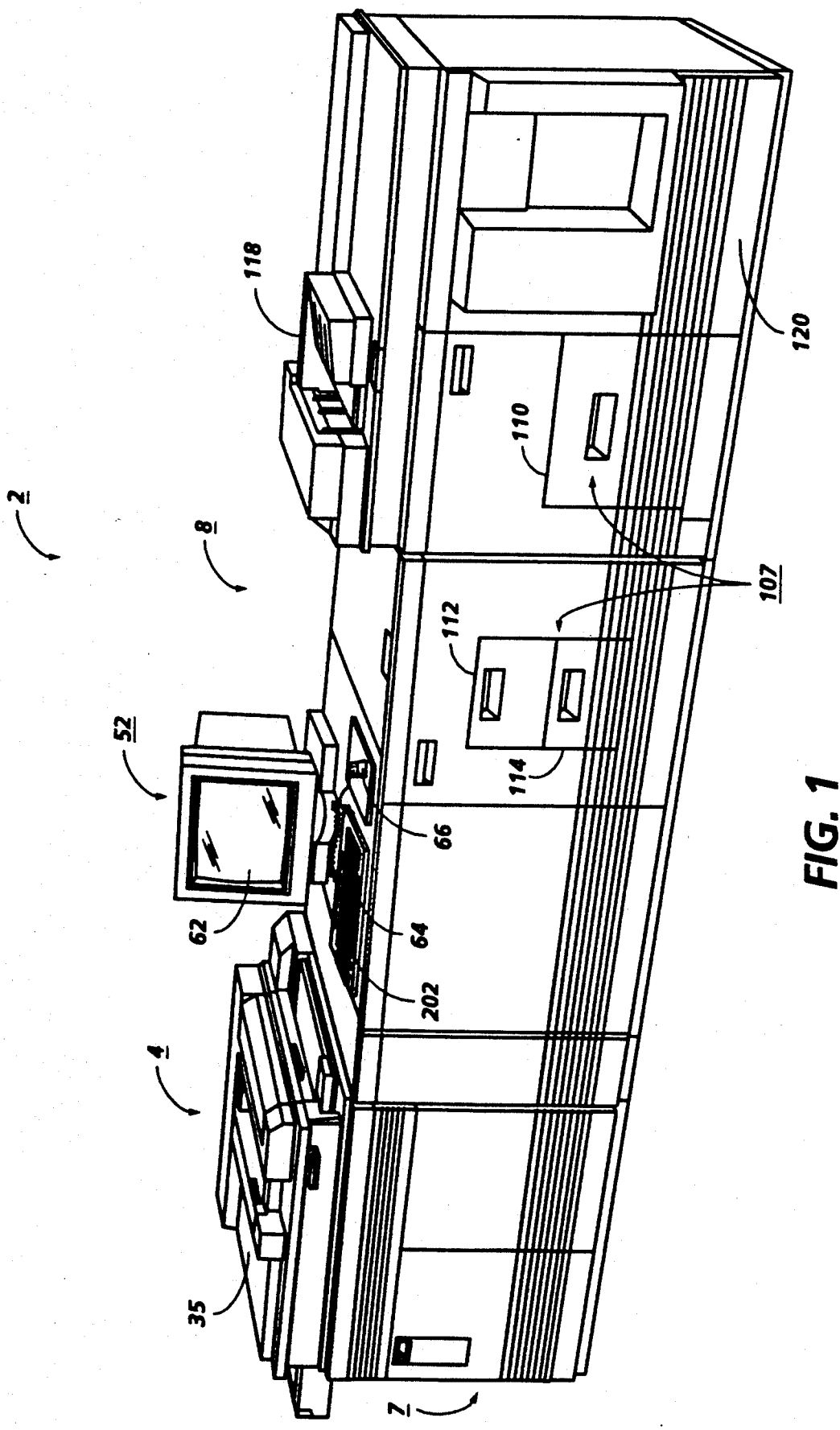
FIG. 1 is a perspective, schematic view of an electronic printing system upon which a preferred job assembling technique can be used.
Figure 2:
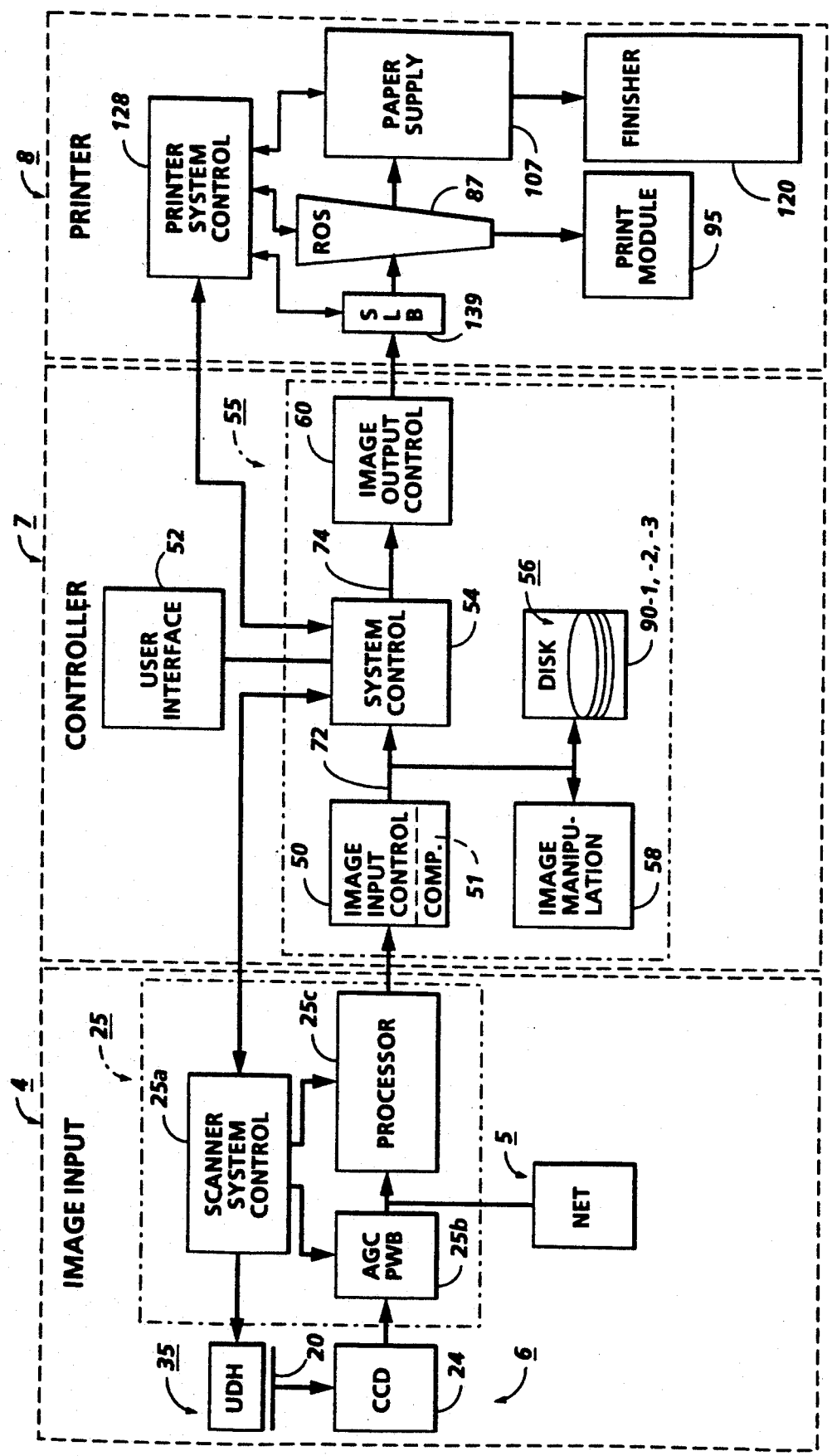
FIG. 2 is a block diagram depicting the major elements of the printing system shown in FIG. 1.
Figure 3:
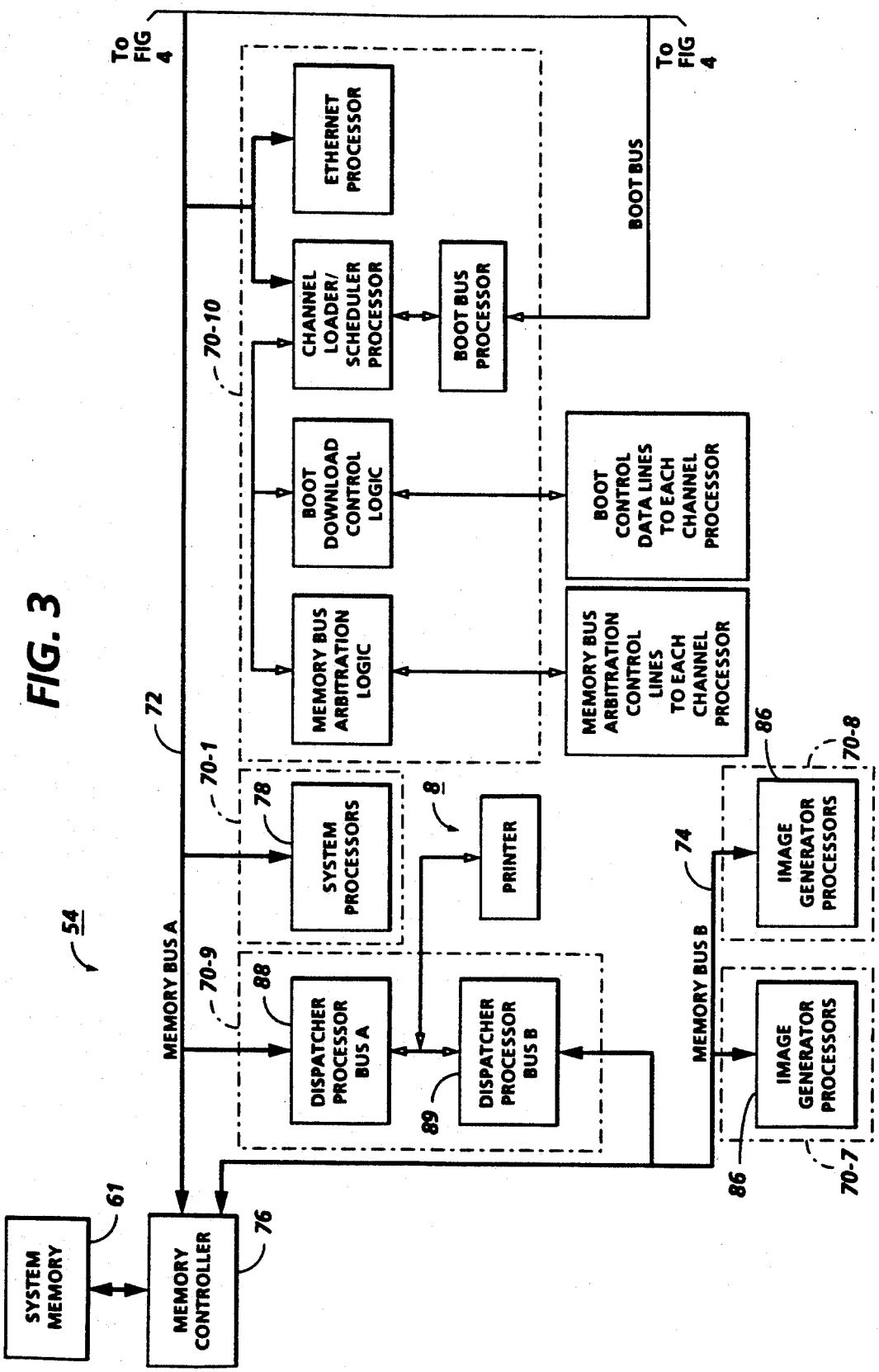
Figure 4:
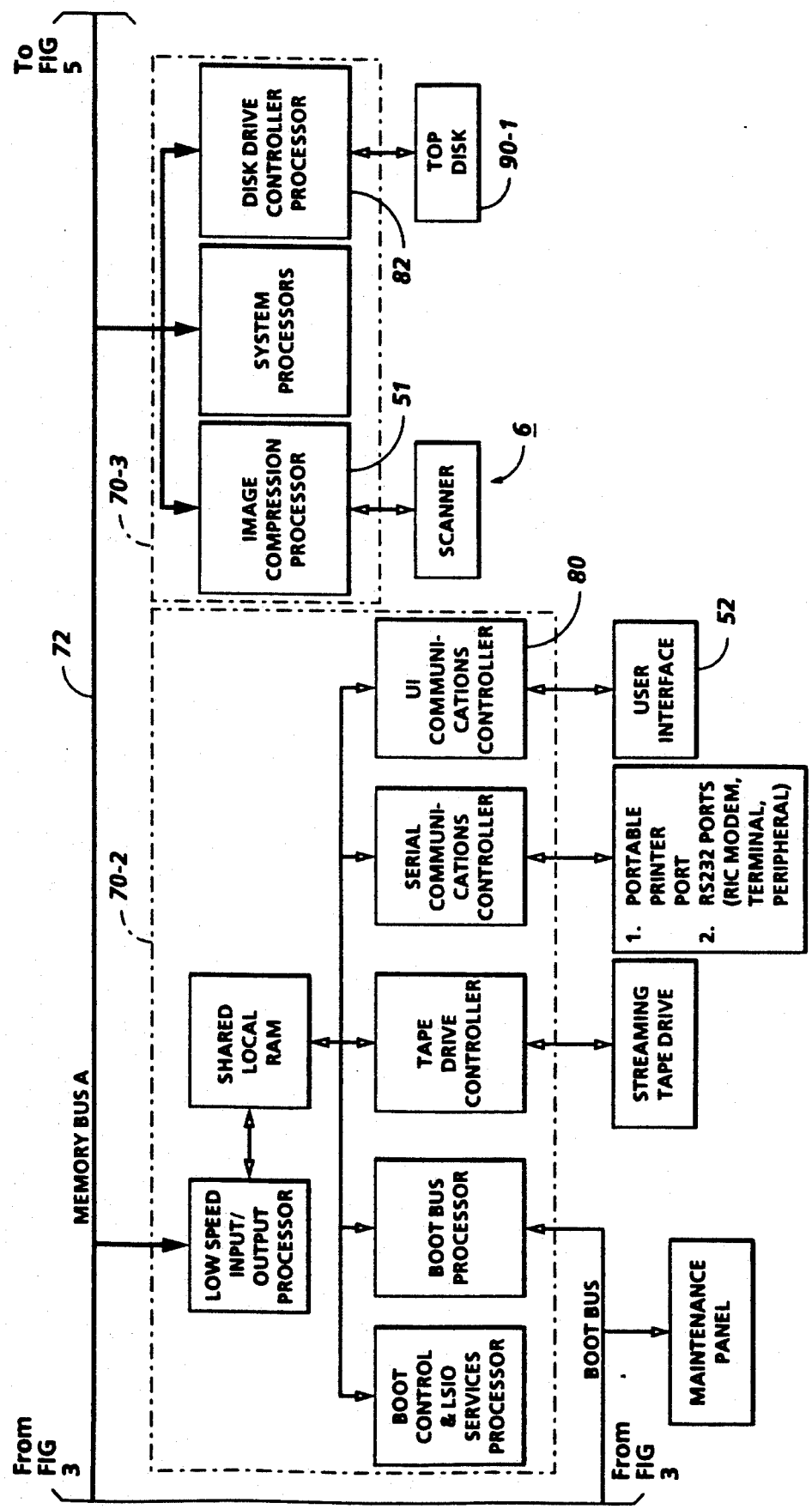
Figure 5:
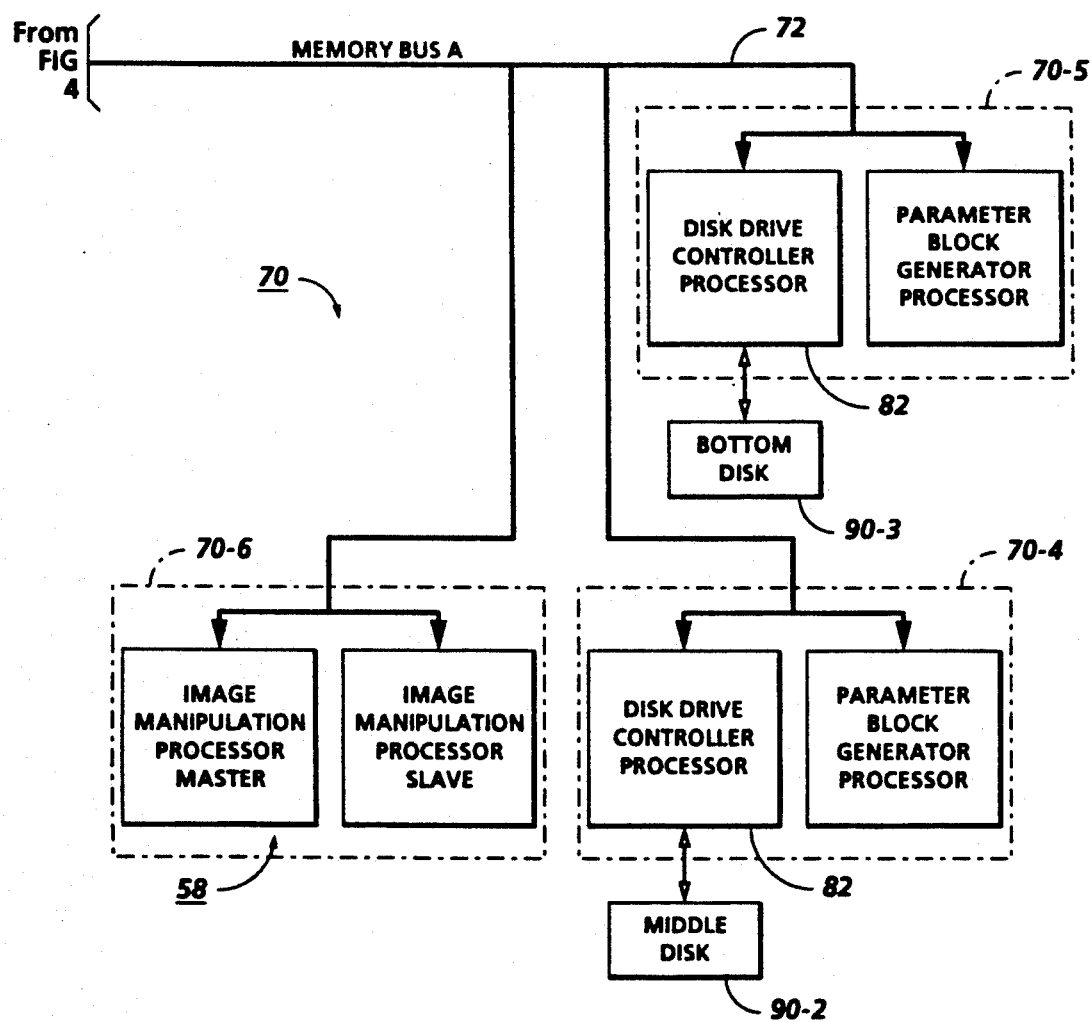
Figure 6:
Figure 7:
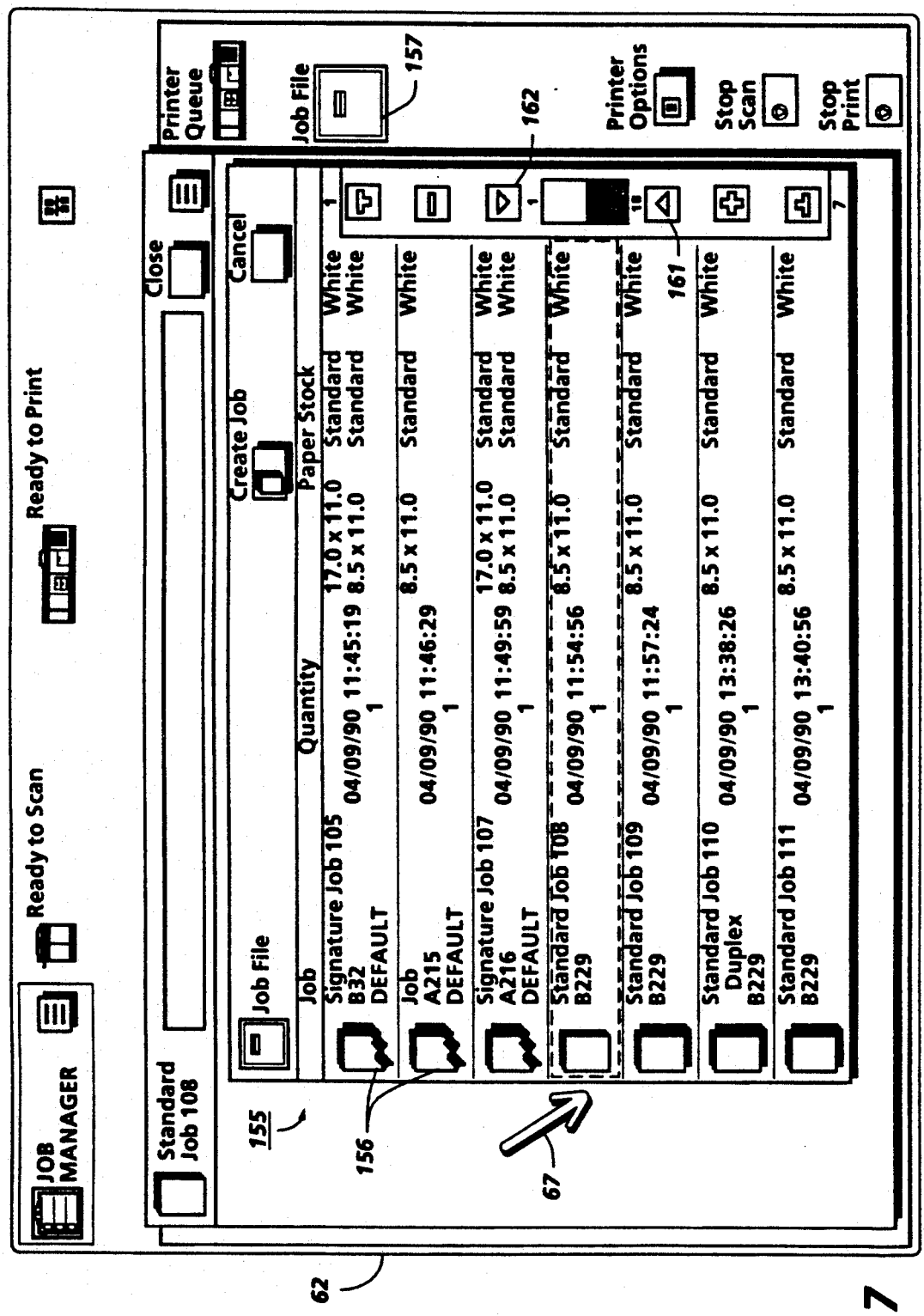
Figure 8:
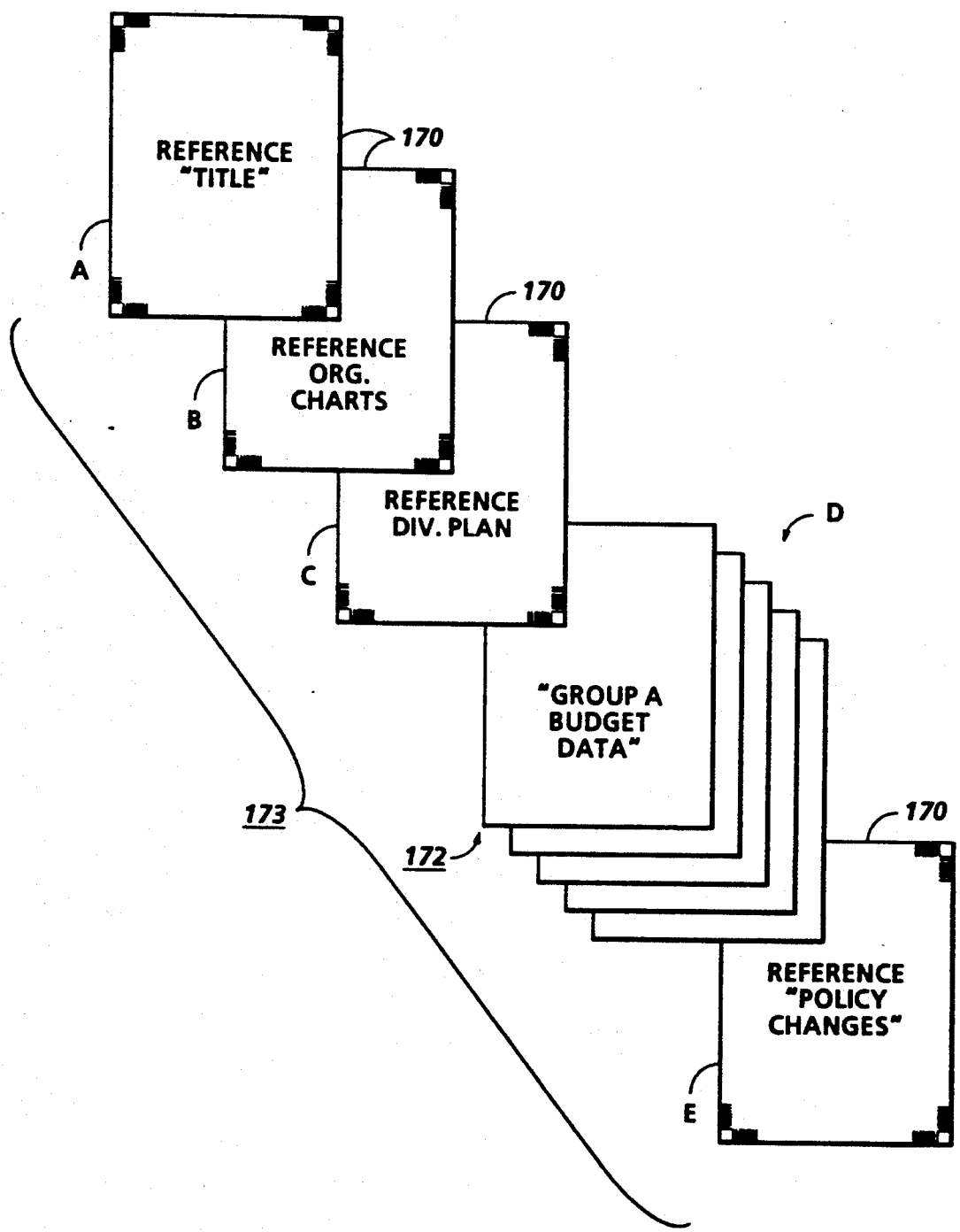
Figure 9A:
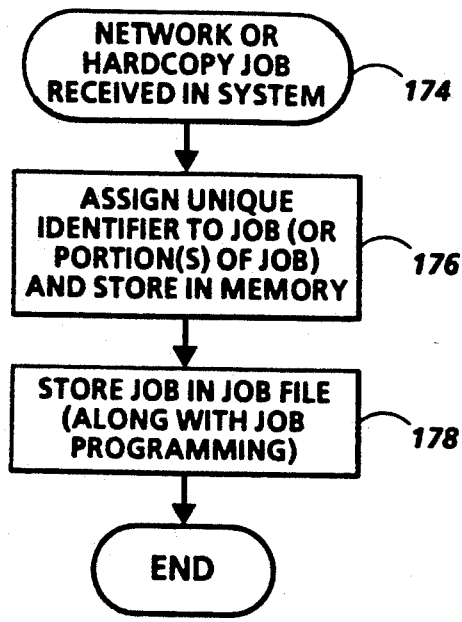
Figure 9B:
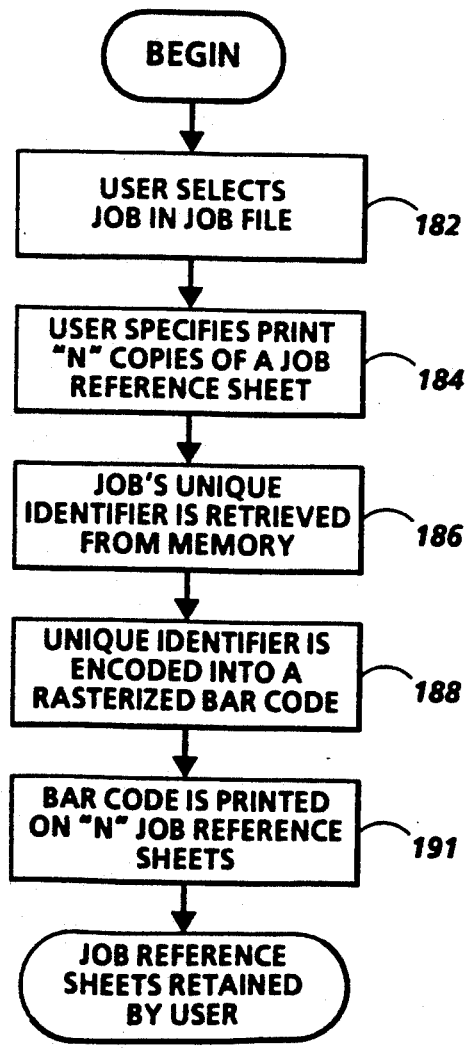
Figure 10:
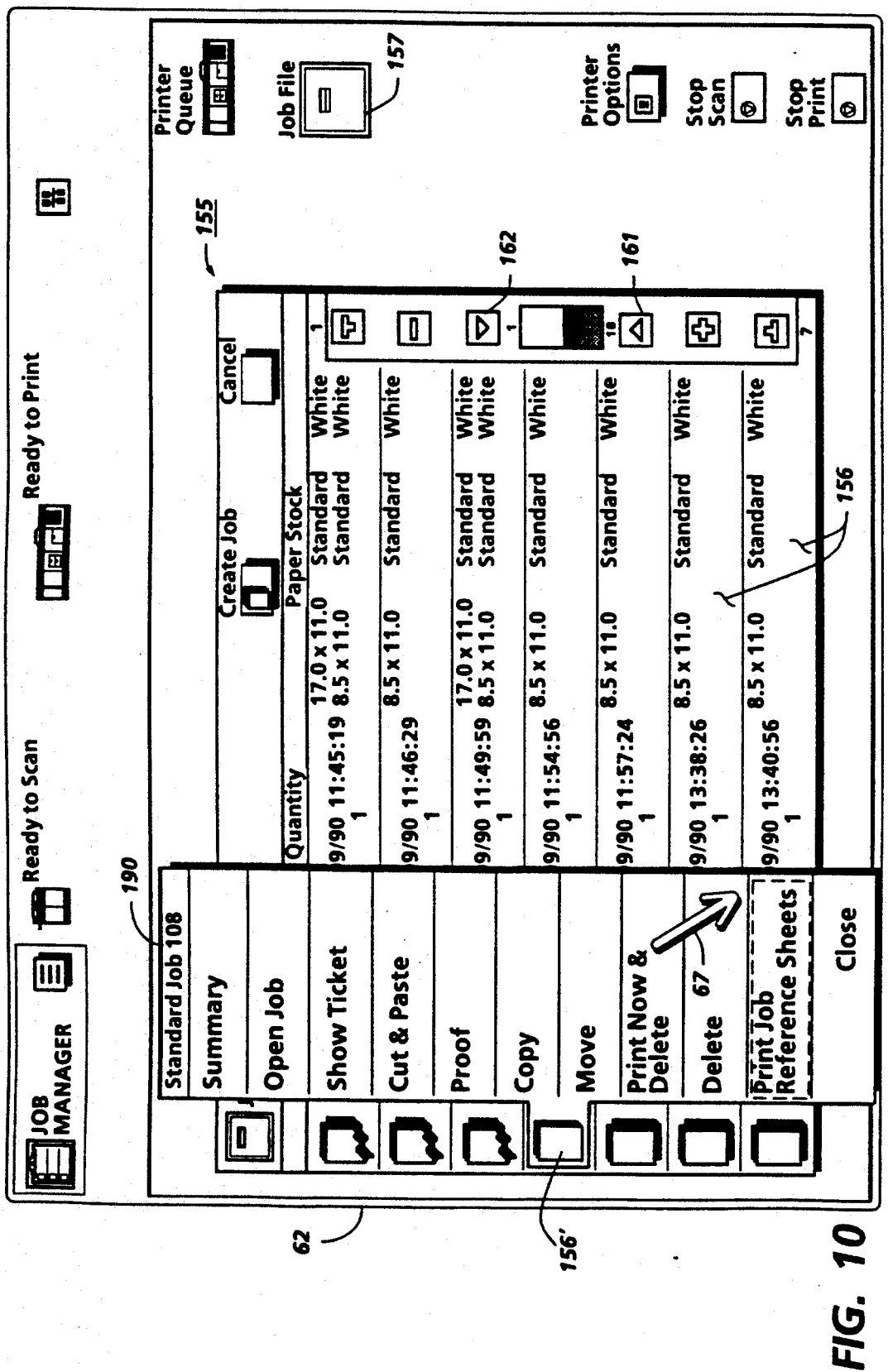
Figure 11:
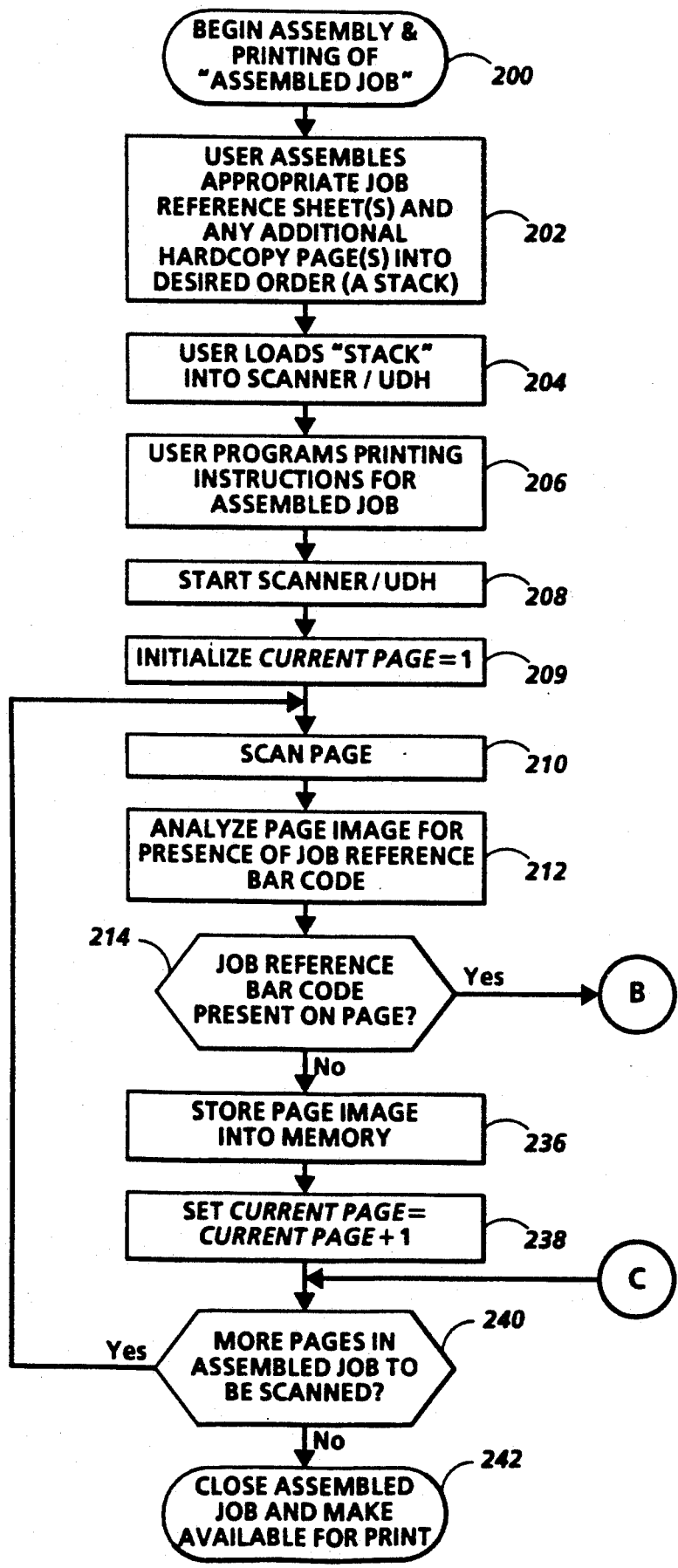
Figure 12:
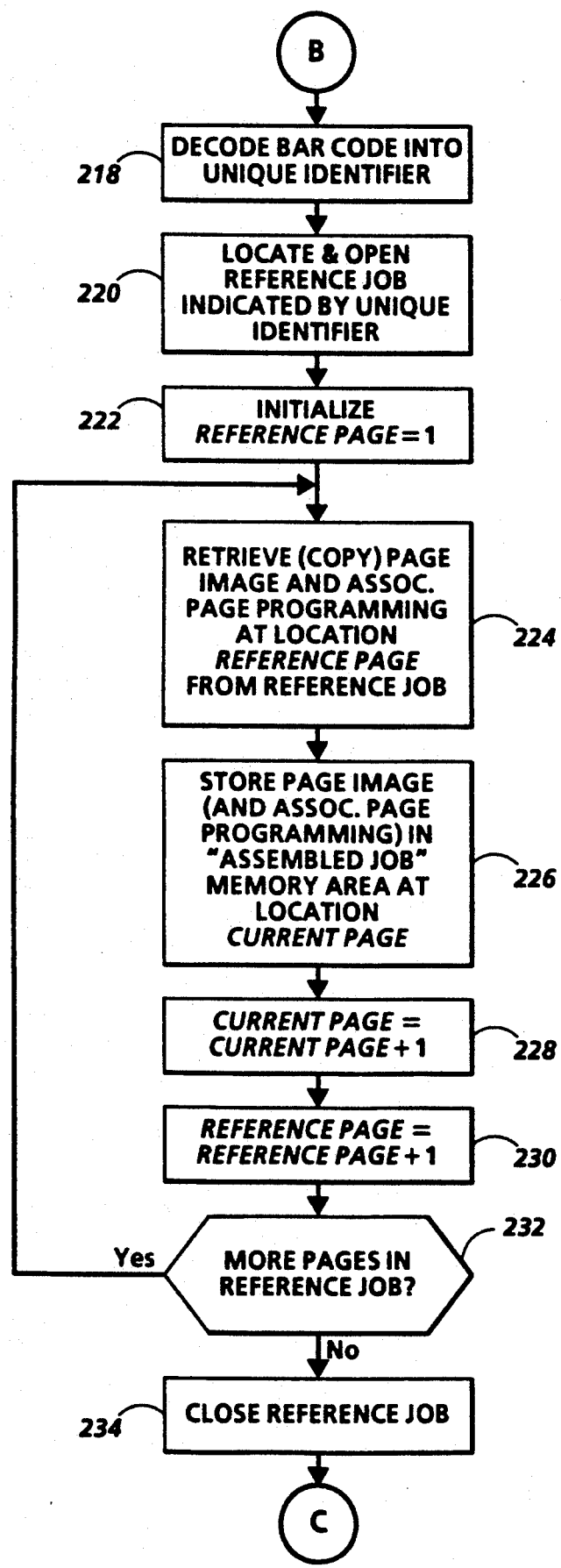

FIGS. 3-5 comprise a block diagram showing the major parts of the control section for the printing system shown in FIGS. 1 and 2;

FIG. 6 is a view depicting an exemplary job programming ticket and job scorecard displayed on a User Interface (UI) of the printing system shown in FIG. 1, the job ticket and job scorecard being associated with a job to be printed;

FIG. 7 is a view of a user interface touchscreen display depicting a job queue or job file, the job file containing jobs stored in memory of the printing system;

FIG. 8 is a perspective, exploded view of a stack of documents arranged for scanning with the stack being segregated into a set of originals inserted between a plurality of job reference sheets;

FIGS. 9A and 9B are flow diagrams which serve conjunctively to illustrate a preferred approach for creating one of the job reference sheets of FIG. 8;

FIG. 10 is a view of the user interface touchscreen display illustrating the manner in which a specific job in the job file is accessed for printing a job reference sheet;

FIGS. 11 and 12 are flow diagrams which serve conjunctively to illustrate the manner in which a stack, including one or more documents, is compiled into an assembled job.

Referring to the drawings where like reference numerals designate identical or corresponding parts throughout the several views, and more particularly to FIGS. 1 and 2, there is shown an exemplary image printing system 2 for processing print jobs in accordance with the teachings of the present invention. Printing system 2, for purposes of explanation, is divided into image input section 4, controller section 7, and printer section 8. In the example shown, the image input section 4 has both remote and on-site image inputs, enabling system 2 to provide network, scan, and print services. Other system combinations may be envisioned such as a stand alone printing system with on-site image input (i.e., a scanner), controller, and printer; a network printing system with remote input, controller, and printer; etc.

While a specific printing system is shown and described, the present invention may be used with other types of printing systems. For example, printer section 8 may instead use a different printer type such as ink jet, ionographic, thermal, photographic, etc., and, furthermore, may be incorporated in electronic display systems, such as CRTs, LCDs, LEDs, etc. or else other image scanning/processing/recording systems, or else other signal transmitting/receiving, recording systems, etc. as well.

For off-site image input, image input section 4 has a network 5 with a suitable communication channel such as a telephone line enabling image data in the form of image signals or pixels from one or more remote sources to be input to system 2 for processing. Other remote sources of image data such as streaming tape, floppy disk, video camera, etc. may be envisioned.

For on-site image input, section 4 has a document scanner section 6 with a Universal Document Handler (UDH) 35 for the purpose of automatically and sequentially placing and locating sets of multiple documents for scanning. Scanner section 6 incorporates one or more linear light sensitive arrays 24 for reciprocating scanning movement below platen 20 and focused on a line-like segment of platen 20 and the document being scanned thereon. Array 24, which may utilize Charge-Coupled Device (CCD) technology or the like, provides image elemental signals or pixels representative of the image scanned which are input to processor 25 for processing.

Processor 25 communicates with the controller section 7 and includes a scanner system control 25a an automatic gain control printing wiring board (AGCPWB) 25b, and a processor 25c. AGCPWB 25b converts the analog image signals output by array 24 to digitally represented facsimile signals and processor 25c processes the digital image signals as required to enable controller section 7 to store and handle the image in the form and order required to carry out the job programmed. After processing, the image signals are output to controller section 7. Image signals derived from net 5 are similarly input to processor 25c.

Processor 25c also provides enhancements and changes to the image signals such as filtering, thresholding, screening, cropping, scaling (reduction/enlargement), etc. Following any changes and adjustments in the job program which affect these image processing parameters, the document must be rescanned to capture the specified modification.

Printer section 8 comprises a laser type printer having a Raster Output Scanner (ROS) 87, Print Module 95, Paper Supply 107, Finisher 120, and Printer System Control 128. ROS 87 has a two beam laser with the beams modulated in accordance with the content of an image signal input by acousto-optic modulator to provide dual imaging beams which are scanned across a moving photoreceptor of Print Module 95 by means of a rotating polygon. This exposes two image lines on the photoreceptor with each scan to create the latent electrostatic images represented by the image signal input to the modulator.

The latent electrostatic images are developed and transferred to a print media delivered by paper supply 107. As will be appreciated by those skilled in the art, print media can comprise a selected one of various known substrates which are capable of accepting an image, such substrates including transparencies, preprinted sheets, vellum, glossy covered stock, film or the like. The print media may comprise any of a variety of sheet sizes, types, and colors, and for this, plural media supply trays 110, 112, 114 (FIG. 1) are provided. The transferred image is permanently fixed or fused and the resulting prints discharged to either output tray 118 (FIG. 1), or to finisher 120. Finisher 120 provides certain finishing selections such as a stitcher for stitching or stapling the prints together to form books, a thermal binder for adhesively binding the prints into books, and/or other finishing options such as slitting, perforating, saddle stitching, folding, trimming, or the like.

Printer system control 128 (FIG. 2) automatically and precisely controls all the printer functions and operations in accordance with job program parameters received from system control 54 of controller section 7, as well as from internally derived signals from sensors and processes within the printer section 8. Printer system control signals are derived and distributed via a plurality of printed wiring boards (PWBs) in a multiprocessor architecture characterized by multiple microprocessor controller cores, serially interconnected, and also serially linked to more numerous input/output processing circuit PWBs. Controller section 7 is, for explanation purposes, divided into an image input control 50, User Interface (UI) 52, system control 54, main memory 56, image manipulation section 58, and image output control 60. The units 50, 54, 56, 58, 60 comprise a system which may also generally be referred to as the "Electronic Subsystem" (ESS).

The scanned image data input from processor 25c of scanner section 6 to controller section 7 is compressed by image compressor/processor 51 of image input control 50 and placed in an image file. Image files, which represent different print jobs, are temporarily stored in system memory 61 (seen in FIG. 3) pending transfer to main memory 56 where the data is held pending use.

Referring again to FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, and to obtain system operating information, visual document facsimile display, programming information and icons, diagnostic information and pictorial views, etc. Items displayed on touchscreen 62 such as files and icons are actuated by either touching the displayed item on screen 62 with a finger, or by using mouse 66 to point cursor 67 (FIG. 4) to the item selected and keying the mouse.

Main memory 56 (FIG. 2) has plural hard disks 90-1, 90-2, 90-3 for storing machine Operating System software, machine operating data, and the scanned image data currently being processed. When the compressed image data in main memory 56 requires further processing, is required for display on touchscreen 62 of UI 52 or is required by printer section 8, the data is accessed in main memory 56. Where further processing other than that provided by processor 25 is required, the data is transferred to image manipulation section 58 where the additional processing steps such as collation, make ready (document editing), decomposition, rotation, etc., are carried out. Following processing, the data may be returned to main memory 56, sent to UI 52 for display on touchscreen 62, or sent to image output control 60.

Referring particularly to FIGS. 3-5, image data output to image output control 60 is decompressed and readied for printing by image generating processors 86 of printed wiring boards ("PWBs") 70-7, 70-8. Following this, the data is output by dispatch processors 88, 89 on PWB 70-9 via Scan Line Buffer (SLB) 139 (FIG. 2) to printer section 8. Image data sent to printer section 8 for printing is normally purged from memory 56 to make room for new image data.

Control section 7 includes a plurality of PWBs 70 (FIGS. 3-5), PWBs 70 being coupled with one another and with system Memory 61 by a pair of buses 72, 74. In the preferred embodiment, the System Memory includes a suitable programs for assigning unique job identifiers to each of the jobs inputted to or associated with the printing system 2 and for generating a printable representation, such as an encoded rasterized bar code, for each job. A memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processor 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Referring to FIG. 6, jobs are programmed in a Job Program mode in which there is displayed on touchscreen 62 a Job Ticket 150 and a Job Scorecard 152 for the job being programmed. Job Ticket 150 displays various job selections available for programming, while Job Scorecard 152 displays the basic instructions to the system for printing the job. Various Job Ticket types are provided, with access by means of Job Types and Tickets icon 157.

Each Job Ticket 150 has two programming levels, referred to as "Job Level" and "Page Level", each having a series of icons for accessing the various programming selections available at that level. In the illustrated embodiment of FIG. 6, the page level instructions are set off in two sublevels, namely "Basic" and "Special" instructions. Each programming level has a Scorecard 152 associated with it so that on activation of a particular job level or of a specific icon, the appropriate Scorecard is displayed on touchscreen 62.

As described, print jobs may be derived from multiple sources, i.e., jobs scanned in using scanner 6 for printing; jobs scanned in, stored, and then edited or added to for printing later; jobs remotely scanned in and submitted to the system as, for example, through net 5

(FIG. 2); jobs remotely developed and then submitted to the system for printing, etc.

Referring to FIG. 7, the image files are arranged in a job file 155, with the print jobs 156 numbered consecutively in the order in which the print jobs are scanned in. Where the operator wishes to see the jobs currently residing in job file 155, a JOB FILE icon 157 on touchscreen 62 is actuated. This displays a list of the jobs 156 currently in the job file on screen 62, an example of which is shown in FIG. 9. Each job is identified by a descriptor showing the type of job, job number, number of prints, etc. By using up and down scrolling icons 161, 162, the operator can scroll the list of jobs where the number of jobs in the job file is too large to be simultaneously displayed on touchscreen 62.

Referring to FIG. 8, an exemplary approach for compiling a plurality of jobs is shown. The exemplary approach includes the step of physically assembling a job with various components, namely 1-to-n job reference sheets 170 and 0-to-m sets 172 of hard-copy originals, and scanning the various components. In practice, various components are arranged in an ordered stack 173, the order of the stack corresponding to the order in which a master document, i.e. a compilation of various jobs, is to be printed. The ordered components are inputted to the system with the scanner section 6.

Referring to FIGS. 9A and 9B, an exemplary procedure for developing and printing each of the job reference sheets 170 is shown. Referring specifically to FIG. 9A, at step 174, a network or hard-copy job is received with its Job Programming instructions, the instructions being inputted via the job ticket 150 (FIG. 6) or via an electronic equivalent that is received via the network 5 (FIG. 2) and having both job level and page level instructions. For a hard-copy job, the scanner section 6 is used to input the image data to be represented by the job reference sheet 170, while, for a network job, image data can be received by way of the network 5 (FIG. 2), or may be retained in a remote storage section, referenced by pointer from the printing system 2 and retrieved when actually needed.

Preferably, each job is programmed with at least two job level designators, namely a job name and job disposition. Upon receiving the job, from either the scanner or the remote storage source, the job is assigned a unique identifier (step 176) with the assigning program of the system memory 61. As further illustrated by step 176, a unique job identifier can be assigned to one or more portions of the job, rather than the entire job itself, without altering the concept upon which the present invention is based. As can be appreciated by those skilled in the art, the capability to print portions of a stored job facilitates the process of "demand publication". As can further be appreciated by those skilled in the art, the assigning program typically would include a database for facilitating the process of assigning the unique job identifiers and for storing the identifiers. The database could be constructed readily by reference to one of several known texts, such as the following text:

Martin, J.
Computer Data-Base Organization
Prentice Hall, Inc.
Englewood Cliffs, N.J.
1975

Pertinent portions of the above-mentioned text are incorporated herein by reference. After a unique job identifier is assigned to a given job, the job is stored in the job file 155 of FIG. 7 (step 178) or, alternatively, in the remote storage section. While, preferably, the identifiers are stored in the above-mentioned database of system memory 61, they could, alternatively, be stored along with their respective jobs.

Referring conjunctively to FIGS. 9B and 10, at step 182, the user "selects" the job in the job file 155 and, at step 184, specifies the number of job reference sheets to be printed. Upon selecting one of the jobs 156, with either a fingertip or the point cursor 67, the selection menu 190 is actuated. For ease of discussion, the highlighted job is designated with the numeral 156'. At step 186 the database of system memory 61 is accessed for retrieving a unique job identifier from the system memory 61, the identifier corresponding to the job 156'. The retrieved identifier is then encoded into a rasterized bar-code, at step 188, with any conventional technique, such as the technique referred to as "Matrix 2 of 5". It will be appreciated that the identifier could be translated into various other codes, such as "glyphs", "marksense", etc. To print the job reference sheet corresponding to job 156' (step 191), the area indicated as "PRINT JOB REFERENCE SHEET" is actuated with the fingertip or point curser. As suggested by U.S. Pat. No. 5,164,842 to Gauronski et al., the pertinent portions of which are incorporated herein by reference, the software associated with the selection menu 190 can be modified readily for printing a plurality of copies from a given job reference sheet.

Referring again to FIG. 8, a job title, along with copies of a bar code, are printed on each job reference sheet in a manner consistent with the disclosure of U.S. Pat. No. 4,757,348 to Rourke et al., the pertinent portions of which are incorporated herein by reference. As can be recognized, for each job reference sheet, copies of a single bar code are distributed about the sheet so that proper scanning of the sheet is insured.

Referring to FIGS. 11 and 12, a preferred technique for processing any assembled combination of job reference sheets 170 and sets 172 is discussed in further detail. To begin the assembling technique (step 200), the user arranges (per step 202) one or more appropriate job reference sheets 170, and any additional sets of originals 172 into a desired order to form a stack. As will appear the order in which the sheets 170 and sets 172 are arranged determines the order in which the assembled job is compiled. Once the stack is loaded into the UDH 35 (FIG. 2) (step 204) and the Job Programming Instructions for the assembled job are programmed (step 206), the scanner/UDH is started so that each page of the stack is scanned.

A variable "CURRENT PAGE" is initialized at step 210 and thereafter used to maintain a count throughout a job compiling process. As a page is scanned (step 210), the corresponding page image is analyzed (step 212) for the presence of a job reference bar code. If a job reference bar code is found, then the process proceeds to step 218 (FIG. 12) where the bar code is decoded into a corresponding unique job identifier. Pursuant to the decoding step, a job referenced by the identifier is located in memory of the printing system and opened (step 220). It should be recognized that the location referenced by the identifier could comprise a pointer to a remote storage section linked to the printing system by the Net 5 (FIG. 2).

A variable "REFERENCE PAGE" is initialized at step 222 and thereafter used to maintain a count throughout a process of retrieving the referenced job. In the loop defined by steps 224, 226, 228 and 230, copies of the pages in the referenced job are retrieved (step 224) and inserted into a memory section referred to as "Assembled Job", at the memory location of CURRENT PAGE (step 226). It will be appreciated by those skilled in the art that, in another embodiment, the pages for the reference job could be referenced in the memory section of Assembled Job with a referencing scheme so that retrieving of copies would not be required. To maintain the count of the Assembled Job, the variable CURRENT PAGE is incremented (step 228), and to keep track of the number of pages which have been retrieved from the referenced job, the variable REFERENCE PAGE is incremented (step 230).

When it is determined that each page of the referenced job has been copied to Assembled Job (step 232), then the referenced job is closed (step 234) and the process returns to step 240 for determining whether any more pages in the stack need scanning. Referring again to step 214 of FIG. 11, each page of the stack which is not coded is stored in the Assembled Job (step 236) at the location of CURRENT PAGE. Accordingly, the value of CURRENT PAGE is incremented (step 238) each time a page is stored and the process moves on to step 240. If more pages exist in the stack being scanned, then the process loops to step 210 until each page has been scanned appropriately. If, on the other hand, all of the pages in the stack have been scanned, then Assembled Job is closed and made available for printing.

The following example will serve to demonstrate how the above-described process facilitates demand publication. Referring again to FIG. 8, the various components of the stack are referred to as "A", "B", "C", "D" and "E". Moreover the job is subject to the following constraints: First, each of the components is provided to the print system operator ("operator") at a different moment in time. Indeed, component D is not made available until months after the delivery of component A. Second, it is, due to customer demand, necessary to break the set D into four portions, namely "D1", "D2", "D3" and "D4". Third, customer demand dictates the following printing requirements:

1) 10000 copies of "AC(D1)E";
2) 10000 copies of "AB(D2)E";
3) 10000 copies of "ABC(D3)"; and
4) 10000 copies of "BC(D4)E".

Finally, due to the size of the job, the operator cannot print all of the copies at one time.

In accordance with the above-described technique, jobs A, B, C and E are scanned in, as they become available, and three sets of job reference sheets ABCE are printed and stored for later use. When all of the components are available for D, it is portioned into D1, D2, D3 and D4, and arranged with the job reference sheets to form four stacks, corresponding to the above printing requirements. For each stack, a suitable set of Job Programming Instructions is inputted with the UI 52 (FIG. 2) and the stack is then scanned for creating an Assembled Job in memory of the print system 2. With the four Assembled Jobs stored in memory, the operator prints the required copies for the Assembled Jobs as available time arises.

In view of the above description, numerous features of the disclosed embodiment will be recognized by those skilled in the art. One feature of the disclosed embodiment is to facilitate demand publication. As demonstrated by the example above, the disclosed assembling technique provides the customer(s) and print system operator with a high degree of flexibility. For example, the customer can customize publication by either adding certain components to or omitting certain components from a given stack. Another feature of the disclosed embodiment is to simplify the process of arranging, and ultimately printing, a multi-job document. For example, arranging a stack with hard-copy documents permits the print system operator to locate the insertion points for various components with great ease. Yet another feature of the disclosed embodiment is to save time for the print system operator by eliminating the need to perform extensive open and copy operations in developing an Assembled Job. Yet another feature of the disclosed embodiment is to maximize the productivity for certain types of jobs. For example, the disclosed assembling technique facilitates the printing of complex jobs that have been "proofed" and are now ready for final printing.

What is claimed is:

1. A method of printing a job, represented by a set of electronic pages, with a job reference sheet in a printing system having a printer and a scanner adapted to both convert the job into the set of electronic pages and decode machine readable code, comprising the steps of:

storing the set of electronic pages in a memory section;

assigning a unique job identifier to the stored job for indicating a location of the stored job in the memory section;

printing the job reference sheet so that the unique job identifier is designated on the job reference sheet in machine readable code; and scanning the job reference sheet for reading the machine readable code and retrieving the set of electronic pages from the memory section for printing with the printer.

2. The method of claim 1, further comprising the steps of:

providing a second job reference sheet including a second unique job identifier designated in machine readable code, the second unique job identifier indicating a location of a second job, represented by a second set of electronic pages, in a second memory section;

scanning the second job reference sheet for retrieving the second set of electronic pages from the second memory section; and compiling the first set of electronic pages with the second set of electronic pages, in response to the scanning steps, to form an assembled job.

3. The method of claim 2, further comprising the step of programming the printing system with Job Programming Instructions for the assembled job.

4. The method of claim 2, further comprising the step of performing said scanning steps in an order corresponding substantially to the desired order of the assembled job.

5. The method of claim 2, in which a selected one of the first and second memory sections is disposed remotely of the printing system, further comprising the step of coupling the selected memory section with the printing system.

6. The method of claim 1, further comprising the steps of:

providing a second job including a set of originals;
   scanning the set of originals for developing a second set of electronic pages representing the second job; and compiling the first set of electronic pages and the second set of electronic pages, in response to the scanning steps, to form an assembled job.

7. The method of claim 6, further comprising the step of analyzing the job reference sheet and each of the originals for determining whether machine readable code is present.

8. The method of claim 7, wherein said compiling step comprises storing the first and second sets of electronic pages, as the assembled job, at a common memory location.

9. The method of claim 6, further comprising the step of programming the printing system with Job Programming Instructions for the assembled job.

10. The method of claim 6, further comprising the step of performing said scanning steps in an order corresponding substantially to the desired order of the assembled job.

11. The method of claim 10, further comprising the step of analyzing the job reference sheet and each of the originals to determine the presence of machine readable code therein.

12. The method of claim 11, further comprising the steps of:
accessing the first set of electronic pages, in response to determining the presence of machine readable code; and
copying the first set of electronic pages to a memory location having the first and second sets of electronic pages compiled thereat.

13. The method of claim 1, wherein said printing step comprises printing an encoded, rasterized bar code on the job reference sheet.

14. A method of producing a job reference sheet for a job, represented by a set of electronic pages, with a printing system communicating with a memory section, comprising the steps of:
storing the set of electronic pages in the memory section;
assigning a unique job identifier to the stored job for indicating a location of the stored job in the memory section;
generating a printable representation of the unique job identifier; and
printing the printable representation, as a machine readable code, on a substrate.

15. The method of claim 14, wherein said step of generating comprises encoding a rasterized bar code.

16. The method of claim 14, wherein said storing step comprises scanning a set of originals with a scanner for generating the set of electronic pages.

17. The method of claim 14, wherein said storing step comprises programming the printer with Job Programming Instructions for the job.

18. The method of claim 14, further comprising the steps of:
scanning the job reference sheet for reading the machine readable code; and
retrieving the set of electronic pages from the memory section for printing.

19. The method of claim 14, wherein said storing step comprises disposing the memory section at a location remotely disposed of the printing system.

20. A method of producing a reference sheet for a job portion, represented by a first set of electronic pages, with a printing system communicating with a memory section, comprising the steps of:
storing the job, as represented by a second set of electronic pages, in the memory section;
assigning a unique identifier to the stored job portion for indicating a location of the stored job portion in the memory section;
generating a printable representation of the unique identifier; and
printing the printable representation, as a machine readable code, on a substrate.

21. The method of claim 20, wherein said storing step comprises scanning a set of originals with a scanner for generating the second set of electronic pages.

22. The method of claim 20, wherein said storing step comprises programming the printer with Job Programming Instructions for the job.

23. The method of claim 20, further comprising the steps of:
scanning the reference sheet for reading the machine readable code; and
retrieving the first set of electronic pages from the memory section for printing.

24. The method of claim 20, wherein said storing step comprises disposing the memory section at a location remotely disposed of the printing system.

* * * * *